United States Patent [19]

Murakami et al.

[11] Patent Number: 4,818,791
[45] Date of Patent: Apr. 4, 1989

[54] RESIN COMPOSITION FOR USE IN POWDER PAINT

[75] Inventors: Haruhiko Murakami, Jakarta; Hirofumi Takeda, Yao; Hiroshi Sakamoto, Nara, all of Japan

[73] Assignee: Dainippon Ink and Chemicals, Inc., Tokyo, Japan

[21] Appl. No.: 35,925

[22] Filed: Apr. 8, 1987

[30] Foreign Application Priority Data

Apr. 12, 1986 [JP] Japan .................................. 61-83236
Jun. 3, 1986 [JP] Japan ................................ 61-127315

[51] Int. Cl.$^4$ ............................................. C08L 67/02
[52] U.S. Cl. .................................... 525/124; 525/125; 525/131
[58] Field of Search ...................... 525/124; 131, 125

[56] References Cited

U.S. PATENT DOCUMENTS 3,993,849 11/1976 Victorius ............................. 428/463
4,281,076 7/1981 Kamimura .......................... 525/124
4,539,218 9/1985 Geist .................................... 427/124

FOREIGN PATENT DOCUMENTS 51-041027 4/1976 Japan ................................. 525/124
53-123496 10/1978 Japan ................................. 525/131
60-120764 6/1985 Japan ................................. 525/124

*Primary Examiner*—Patricia Short
*Attorney, Agent, or Firm*—Sherman and Shalloway

[57] ABSTRACT

A resin composition for use in a powder paint. The composition is either a composition (I) compriisng (A) a polyester resin containing both carboxyl and hydroxyl groups, (B-1) a vinyl monomer containing both (beta-methyl)glycidyl and hydroxyl groups and (C) a blocked isocyanate in a weight ratio of 60–96:3–40:1–20, or a composition (II) comprising (A) a polyester resin containing both carboxyl and hydroxyl groups, (B-2) a (beta-methyl) glycidyl group-containing vinyl polymer, (B-3) a hydroxyl group-containing vinyl polymer, and (C) a blocked isocyanate in a weight ratio of 60–96-:3–40:3–40:1–20.

5 Claims, No Drawings

RESIN COMPOSITION FOR USE IN POWDER PAINT

This invention relates to a novel and useful resin composition for use in a powder paint. More specifically, this invention relates to a resin composition for use in a powder paint, which is composed of a specific polyester resin, a specific reactive polymer and a blocked isocyanate and gives a coated film having excellent physical properties, appearance, weatherability and staining resistance.

Generally, when heated, a powder paint composed of a carboxyl group-containing polyester resin and a vinyl polymer containing a glycidyl group and/or a beta-methylglycidyl group abruptly increases in viscosity from a high-viscosity region because these two resins have poor compatibility with each other and the curing reaction between the carboxyl group and the glycidyl group and/or the beta-methylglycidyl group is fast. Hence, in the coating and baking of such a powder paint, its melt flowability is insufficient, and the resulting cured coated film does not show sufficient physical properties and appearance.

Attempts have been made to increase the compatibility of the polyester resin with the vinyl polymer containing a glycidyl group and/or a beta-methylglycidyl group by introducing a specific amount of hydroxyl groups into the polyester resin in addition to the carboxyl groups, to improve the appearance of the coated film by using a blocked isocyanate together and thus lowering the melt viscosity of the composition during heating, and to improve the physical properties of the coated film by auxiliary crosslinking. However, these prior attempts have not resulted in a good balance among the appearance, staining resistance and various physical properties of the coated film, and it is still difficult to apply such a coating composition to domestic electrical appliances.

The present inventors have extensively worked in order to improve the aforesaid prior art techniques, and have found that the defects of the prior art can be eliminated when [I] a polyester resin containing both carboxyl and hydroxyl groups is used in combination with a vinyl polymer containing both (beta-methyl)glycidyl and hydroxyl groups and a blocked isocyanate, or [II] the polyester resin containing both carboxyl and hydroxyl groups is used in combination with a (beta-methyl)glycidyl group-containing vinyl polymer, a hydroxyl group-containing vinyl polymer, and the blocked isocyanate. In both of the cases [I] and [II], the components have good compatibility with each other. Furthermore, a cured coated film prepared from a powder paint comprising of such a combination of components has excellent physical properties and weatherability and a very good appearance and staining resistance.

Thus, according to this invention, there are provided [I] a resin composition for use in a powder paint comprising as essential components (A) 60 to 96 parts by weight of a polyester resin having an acid number of 5 to 100 mg KOH/g (the unit will hereinafter be omitted), a hydroxyl number of 5 to 100 mg KOH/g (the unit will be omitted hereinafter), a softening point of 80° to 150° C. and a number average molecular weight (to be abbreviated as $\overline{M}n$ hereinafter) of 1,000 to 10,000, (B-1) 3 to 40 parts by weight of a vinyl polymer containing both (beta-methyl)glycidyl and hydroxyl groups and having an $\overline{M}n$ of 300 to 8,000, said polymer being obtained from 10 to 95% by weight of at least one (betamethyl)glycidyl group-containing vinyl monomer selected from the group consisting of glycidyl acrylate (GA), glycidyl methacrylate (GMA), beta-methylglycidyl acrylate (MGA) and beta-methylglycidyl methacrylate (MGMA), 5 to 60% by weight of a hydroxyl group-containing vinyl monomer and 0 to 85% by weight of another vinyl monomer, and (C) 1 to 20 parts by weight of a blocked isocyanate; and [II] a resin composition for use in a powder paint, said composition comprisinq as essential components (A) 60 to 96 parts by weight of a polyester resin having an acid number of 5 to 100, a hydroxyl number of 5 to 100, a softening point of 80° to 150° C. and an $\overline{M}n$ of 1,000 to 10,000, (B-2) 3 to 40 parts by weight of a (betamethyl)glycidyl group-containing vinyl polmmer having an $\overline{M}n$ of 300 to 8,000 and obtained from 10 to 95% by weight of at least one (beta-methyl)glycidyl group-containing vinyl monomer selected from the group consisting of GA, GMA, MGA and MGMA and 5 to 90% by weight of another vinyl monomer copolymerizable with the (beta-methyl)glycidyl group-containing vinyl monomer, (B-3) 3 to 40 parts by weight of a hydroxyl group-containing vinyl polymer having an $\overline{M}n$ of 300 to 8,000 and obtained from 10 to 95% by weight of a hydroxyl group-containing vinyl monomer and 5 to 90% by weight of another vinyl monomer copolymerizable with the hydroxyl group-containing vinyl monomer, and (C) 1 to 20 parts by weight of a b-locked isocyanate.

The polyester resin as component (A) denotes a polyester resin having an acid number of 5 to 100, preferably 10 to 70, a softening point of 80° to 150° C., preferably 100° to 130° C. and an $\overline{M}n$ of 1,000 to 10,000, preferably 2,000 to 5,000. It may be of a branched or linear structure so long as it has the above characteristics.

There is no particular restriction on the method of preparing the polyester resin, and it may be prepared by any known conventional method using any known and conventional polybasic acid components and polyhydric alcohol components.

Typical examples of the polybasic acid components are terephthalic acid, isophthalic acid, phthalic acid, methylterephthalic acid, trimellitic acid and pyromellitic acid and anhydrides of these acids; and adipic acid, sebacic acid, succinic acid, maleic acid, fumaric acid, tetrahydrophthalic acid, methyltetrahydrophthalic acid, hexahydrophthalic acid and methylhexahydrophthalic acid, and anhydrides of these acids. Typical examples of the polyhydric alcohol components are ethylene glycol, propylene glycol, 1,3-butanediol, 1,4-butanediol, 1,6hexanediol, neopentyl glycol, bishydroxyethyl terephthalate, hydrogenated bisphenol A, an adduct of hydrogenated bisphenol A with ethylene oxide or propylene oxide, trimethylolethane, trimethylolpropane, glycerol, pentaerythritol and 2,2,4-trimehylpentane-1,3-diol.

Needless to say, an epoxy group-containing compound may be used in combination with the acid component in the preparation of the polyester. Examples of the epoxy group-containing compound include n-butyl glycidyl ether, phenyl glycidyl ether, glycidyl Versatate, glycidol and bisphenol A-type epoxy resin.

The vinyl polymer containing both (beta-methyl)glycidyl and hydroxyl groups as component (B-1) is obtained from 10 to 95% by weight, preferably 15 to 85% by weight, of at least one (beta-methyl)glycidyl group-containing vinyl monomer selected from the group consisting of GA, GMA, MGA and MGMA; 5 to 60% by weight, preferably 7 to 50% by weight, of a hydroxyl group-containing vinyl monomer, and 0 to 85% by weight, preferably 20 to 75% by weight, of another vinyl monomer.

If the molecular weight of the polymer (B-1) is lower than 300, a coated film prepared from the resulting resin composition has insufficient mechanical strength, and smoking occurs during baking of the coated film. On the other hand, if it exceeds 8,000, the resulting coated film has inferior brightness and smoothness. Moreover, the compatibility between the resins is reduced, and the curing reaction cannot proceed fully so that the resulting coated film has reduced strength.

If in the preparation of the polymer (B-1), the amount of the (beta-methyl)glycidyl group-containing vinyl monomer is less than 10% by weight and the amount of the hydroxyl group-containing vinyl monomer is less than 5% by weight, the compatibility of the polymer (B-1) with the polyester (A) is reduced, and its reaction with the polyester resin (A) proceeds insufficiently. Hence, a good cured film cannot be obtained.

If in the preparation of the polymer (B-1), the amount of the (beta-methyl)glycidyl group-containing vinyl monomer alone is less than 10% by weight, the curing reaction of the polymer (B-1) with the polyester resin (A) becomes insufficient, and good properties cannot be obtained. On the other hand, if the amount of the hydroxyl group-containing vinyl monomer alone is less than 5% by weight, it is necessary to reduce the amount of the blocked isocyanate (C) in order to secure corrosion resistance and retain good physical properties. As a result, the effect of reducing the melt viscosity by the addition of the blocked isocyanate (C) is reduced, and the appearance of the coated film will inevitably be worsened.

As stated above, GA, GMA, MGA and MGMA are the examples of the (beta-methyl)glycidyl group-containing vinyl monomer. Examples of the hydroxyl group-containing vinyl monomer include hydroxyalkyl vinyl ethers such as hydroxyethyl vinyl ether and hydroxybutyl vinyl ether; hydroxyalkyl (meth)acrylates such as beta-hydroxyethyl (meth)acrylate, beta-hydroxypropyl (meth)acrylate, betahydroxybutyl (meth)acrylate and 4-hydroxybutyl (meth)acrylate; N-methylolated (meth)acrylamide; adducts of beta-hydroxyalkyl (meth)acrylates with epsilon-caprolactone; polyethylene glycol mono(meth)acrylate and polypropylene glycol mono(meth)acrylate; adducts formed between unsaturated carboxylic acids such as (meth)acrylic acid, itaconic acid, maleic acid and fumaric acid and monoepoxy compounds typified by monoglycidyl esters or monocarboxylic acids such as glycidyl esters of branched fatty acids, glycidyl octylate and a glycidyl ester of coconut oil fatty acid, or monoglycidyl ethers such as butyl glycidyl ether; allyl alcohol; monoallyl ethers of polyhydric alcohols; monocrotonates of polyhydric alcohols; and low-molecular-weight polyester resins having a polymerizable unsaturated bond.

Typical examples of the polyhydric alcohols include dihydric alcohols such as ethylene glycol, polyethylene glycol, propylene glycol, polypropylene glycol, 1,3-butylene glycol, 1,4-butylene glycol and 1,6-hexanediol; trihydric alcohols such as glycerol, trimethylolethane and trimethylolpropane; and dihydroxyethyl fumarate.

In the preparation of the polymer (B-1), another copolymerizable vinyl monomer may be used together with the (beta-methyl)glycidyl group-containing vinyl monomer and the hydroxyl group-containing vinyl monomer. Examples of the other vinyl monomer are various (meth)acrylic esters excepting the aforesaid (beta-methyl)glycidyl group-containing vinyl monomers and hydroxyalkyl (meth)acrylates, i.e. alkyl (meth)acrylates having 1 to 22 carbon atoms in the alkyl moiety such as ethyl (meth)acrylate and butyl (meth)acrylate, cyclohexyl (meth)acrylate and 2-ethoxyethyl (meth)acrylate; aromatic vinyl monomers such as styrene, t-butylstyrene, alpha-methylstyrene and vinyltoluene; nitrogen-containing vinyl monomers, for example (meth)acrylonitrile, (meth)acrylamides containing no hydroxyl group such as (meth)acrylamide or N-alkoxymethylated (meth)acrylamides, N,N-diethylaminoethyl (meth)acrylate and diethylaminopropyl (meth)acrylate; unsaturated carboxylic acids and their esters, such as (meth)acrylic acid, itaconic acid, maleic acid and fumaric acid, and monoesters of maleic or fumaric acid with monohydric alcohols having 1 to 4 carbon atoms; diesters of maleic acid or fumaric acid with monohydric alcohols having 1 to 18 carbon atoms; vinyl esters such as vinyl acetate, vinyl propionate and vinyl Versatate; phosphorus-containing vinyl monomers such as diphenyl[2-(meth)acryloyloxyethyl) phosphate; and fluorine-containing vinyl monomers such as tetrafluoroethylene and hexafluoropropylene.

The other vinyl monomers illustrated above may be used singly or in combination depending upon the desired film properties. Cyclohexyl (meth)acrylate, ethyl Cellosolve (meth)acrylate, and styrene are especially preferred because they have superior compatibility with the polyester resin component (A).

The (beta-methyl)glycidyl group-containing vinyl polymer as component (B-2) has an $\overline{Mn}$ of 300 to 8,000, preferably 500 to 6,000 and is obtained from 10 to 95% by weight, preferably 15 to 80% by weight, of at least one (beta-methyl)glycidyl group-containing vinyl monomer selected from the group consisting of GA, GMA, MGA and MGMA and 5 to 90% by weight, preferably 20 to 85% by weight, of another vinyl monomer copolymerizable with the (beta-methyl)glycidyl group-containing vinyl monomer.

If in the preparation of the polymer (B-2), the amount of the (beta-methyl)glycidyl group-containing vinyl monomer is less than 10% by weight, good film properties cannot be obtained. On the other hand, if it exceeds 95% by weight, a cured coated film prepared from the resulting resin composition is liable to become brittle and has unsatisfactory properties.

The other vinyl monomer copolymerizable with the (beta-methyl)glycidyl group-containing vinyl monomer used in the preparation of the polymer (B-2) may be the same as the various monomers exemplified above with regard to the preparation of the polymer (B-1).

The hydroxyl group-containing vinyl monomer as component (B-3) has an $\overline{Mn}$ of 300 to 8,000, preferably 500 to 6,000, and is obtained from 10 to 95% by weight, preferably 15 to 80% by weight, of a hydroxyl group-containing vinyl monomer, and 5 to 90 % by weight, preferably 20 to 85% by weight, of another vinyl monomer copolymerizable with the hydroxyl group-containing vinyl monomer. If in the preparation of the polymer (B-3), the amount of the hydroxyl group-containing vinyl monomer is less than 10% by weight, its compatibility with the polyester resin (A) is worsened. If, on the other hand, it exceeds 95% by weight, a cured coated film prepared from the resulting composition has poor water resistance.

The hydroxyl group-containing vinyl monomer and the other vinyl monomer used in the preparation of the polymer (B-3) may be the same as those described hereinabove with regard to the preparation of the polymer (B-1).

If the polymer (B-2) and the polymer (B-3) have an $\overline{Mn}$ of less than 300, a coated film prepared from the resulting composition has insufficient mechanical strength, and moreover, smoking occurs at the time of baking the coated film. On the other hand, if it exceeds 8,000, the coated film has inferior brightness or smoothness. Moreover, the compatibility between the resins is worsened, and the curing reaction cannot proceed sufficiently. Consequently, the strength of the coated film is reduced.

There is no particular limitaton on the methods of producing the polymers (B-1), (B-2) and (B-3), and known conventional methods can be directly applied. The solution polymerization technique is recommended because it permits easy controlling of $\overline{Mn}$. Preferably, the solution polymerization is carried out in a conventional solvent such as toluene, xylene and ethyl acetate in the presence of a conventional radical initiator such as azobisisobutyronitrile and benzoyl peroxide. Chain transfer agents such as laurylmercaptan, octylmercaptan, 2-mercaptoethanol, octyl thioglycollate, 3-mercaptopropionic acid or alpha-methylstyrene dimer may be used as a molecular weight controlling agent.

Typical blocked isocyanates as examples of component (C) include products obtained by blocking the free isocyanate groups present in aliphatic, aromatic and alicyclic isocyanates such as hexamethylene diisocyanate, xylylene diisocyanate and isophorone diisocyanate or adducts of these isocyanates with compounds having active hydrogen, with conventional blocking agents such as methanol, isopropanol, butanol, ethyl lactate and epsiloncaprolactam. Examples of the compounds having active hydrogen are various low-molecular-weight compounds such as ethylene glycol, propylene glycol, butylene glycol, trimethylolpropane, glycerol, ethylenediamine and hexamethylenediamine, and various high-molecular-weight compounds such as polyols, polyethers, polyesters and polyamides.

Non-blocked isocyanates being free from any blocking agent and containing a urethdione linkage may be used in combination with the blocked isocyanate (C).

As a first embodiment, the present invention provides a resin composition for use in a powder paint, said composition comprising as essential components (A) the polyester resin, (B-1) the vinyl polymer containing both (beta-methyl)glycidyl and hydroxyl groups and (C) the blocked isocyanate. As a second embodiment, the present invention provides a resin composition for use in a powder paint, said composition comprising as essential components (A) the polyester resin, (B-2) the (beta-methyl)glycidyl group-containing vinyl polymer, (B-3) the hydroxyl group-containing vinyl polymer, and (C) the blocked isocyanate. In the first embodiment, the ratio of components (A):(B-1):(C) used is usually 60-96:3-40:1-20, preferably 60-90:7-30:3-15, by weight. In the second embodiment, the ratio of components (A):(B-2):(B-3):(C) is usually 60-96:3-40:3-40:1-20, preferably 60-90:7-30:7-30:3-15, by weight. It is desirable to maintain the equivalent ratio of the epoxy groups to the carboxyl groups and the equivalent ratio of the hydroxyl groups to the free isocyanate groups, within the range of from 0.5 to 1.5.

As required, the resulting resin composition of this invention may contain a pigment or other fillers; a flow controlling agent such as 2-ethylhexyl acrylate polymer or silicones; various curing catalysts such as amines, imidazoles or organotin compounds, and various other resins for improving film properties, such as epoxy resins or petroleum resins.

The resin composition of this invention is kneaded by using a conventional kneader such as an extruder, and then pulverized to form a powder paint. The powder paint may be applied by a conventional method such as electrostatic coating or fluidized bed coating.

The following Referential Examples, Examples and Comparative Examples illustrate the present invention more specifically. All parts in the following examples are by weight.

REFERENTIAL EXAMPLE 1

Preparation of a polyester resin (A):

A mixture composed of 344 parts of ethylene glycol, 1,348 parts of neopentyl glycol, 1,796 parts of dimethyl terephthalate and 1.8 parts of zinc acetate was heated gradually to 210° C. while the resulting methanol was removed out of the reaction system. Further, 596 parts of terephthalic acid, 740 parts of isophthalic acid, 80 parts of adipic acid and 2 parts of dibutyltin oxide were added, and the mixture was heated to 240° C. over the course of 10 hours.

The reaction product obtained was cooled to 180° C., and 136 parts of trimellitic anhydride was added. The mixture was continued at 180° C. to give a polyester resin (A) having an acid number of 24, a hydroxyl number of 14, a softening point of 114° C. and an $\overline{Mn}$ of 4,000. The polyester resin obtained will be abbreviated as resin (A-1) hereinafter.

REFERENTIAL EXAMPLE 2

Preparation of a polyester resin (A):

A mixture composed of 336 parts of ethylene glycol, 1,316 parts of neopentyl glycol, 1,752 parts of dimethyl terephthalate and 1.8 parts of zinc acetate was gradually heated to 210° C. while the resulting methanol was removed out of the system. Thereafter, 1,500 parts of terephthalic acid and 2 parts of dibutyltin oxide were added, and the mixture was heated to 240° C. over the course of 10 hours. It was maintained at this temperature to give a polyester resin (A) having an acid number of 15, a hydroxyl number of 15, a softening point of 117° $\overline{Mn}$ of 3,700. The resulting polyester resin will be abbreviated as resin (A-2) hereinafter.

REFERENTIAL EXAMPLE 3

Preparation of a vinyl polymer (B-1) having both (beta-methyl)glycidyl and hydroxyl groups:

A mixture composed of 25 parts of GMA, 15 parts of beta-hydroxypropyl methacrylate, 30 parts of cyclohexyl methacrylate, 10 parts of n-butyl acrylate, 20 parts of styrene, 1 part of t-butyl perbenzoate and 0.5 part of cumene hydroperoxide was added dropwise over 3 hours under pressure to 100 parts of xylene heated at 150° C. to perform polymerization. After the polymerization reaction, xylene was removed to give the desired polymer having an $\overline{Mn}$ of 1,500. This polymer will be abbreviated as polymer (B-1-1) hereinafter.

REFERENTIAL EXAMPLE 4

Preparation of a vinyl polymer (B-1) having both (beta-methyl)glycidyl and hydroxyl groups:

A vinyl monomeric mixture composed of 20 parts of MGMA, 20 parts of beta-hydroxyethyl methacrylate, 20 parts of ethyl Cellosolve methacrylate, 20 parts of methyl methacrylate and 20 parts of styrene was polymerized by the same operation as in Referential Example 3 to give the desired polymer having an $\overline{Mn}$ of 1,600. This polymer will be abbreviated as polymer (B-1-2) hereinafter.

REFERENTIAL EXAMPLE 5

Preparation of a vinyl polymer (B-1) having both (beta-methyl)glycidyl and hydroxyl groups:

A mixture composed of 25 parts of GMA, 15 parts of beta-hydroxypropyl methacrylate, 50 parts of cyclohexyl methacrylate, 10 parts of n-butyl acrylate and 4.5 parts of azobisisobutyronitrile was added dropwise over 4 hours to 100 parts of xylene to perform polymerization while refluxing. At 90° C., 0.3 part of azobisisobutyronitrile was added, and the polymerization was continued. After the polymerization reaction, xylene was removed to give the desired polymer having an $\overline{Mn}$ of 3,100. This polymer will be abbreviated as polymer (B-1-3) hereinafter.

REFERENTIAL EXAMPLE 6

Preparation of a (beta-methyl)glycidyl group-containing vinyl polymer (B-2):

A mixture composed of 45 parts of GMA, 10 parts of n-butyl methacrylate, 20 parts of cyclohexyl methacrylate, 5 parts of n-butyl acrylate, 20 parts of styrene, 1 part of t-butyl perbenzoate and 0.5 part of cumene hydroperoxide was added dropwise over 3 hours under pressure to 100 parts of xylene heated at 150° C. to perform polymerization. After the polymerization reaction, xylene was removed to give the desired polymer having an $\overline{Mn}$ of 1,500. This polymer will be abbreviated as polymer (B-2-1) hereinafter.

REFERENTIAL EXAMPLE 7

Preparation of a (beta-methyl)glycidyl group-containing vinyl polymer (B-2):

A vinyl monomeric mixture composed of 40 parts of MGMA, 10 parts of n-butyl methacrylate, 15 parts of ethyl Cellosolve methacrylate, 15 parts of methyl methacrylate and 20 parts of styrene was polymerized by the same operation as in Referential Example 6 to give the desired polymer having an $\overline{Mn}$ of 1,600. This polymer will be abbreviated as polymer (B-2-2) hereinafter.

REFERENTIAL EXAMPLE 8

Preparation of a hydroxyl group-containing vinyl polymer (B-3):

By the same method as in Referential Example 3, 34 parts of beta-hydroxypropyl methacrylate, 21 parts of n-butyl methacrylate, 15 parts of cyclohexyl methacrylate, 10 parts of n-butyl acrylate and 20 parts of styrene were polymerized to give the desired polymer having an $\overline{Mn}$ of 1,600. This polymer will be abbreviated as polymer (B-3-1).

REFERENTIAL EXAMPLE 9

Preparation of a hydroxyl group-containing vinyl polymer (B-3):

By the same method as in Referential Example 3, 40 parts of beta-hydroxypropyl methacrylate, 10 parts of n-butyl methacrylate, 15 parts of ethyl Cellosolve methacrylate, 15 parts of methyl methacrylate and 20 parts of styrene were polymerized to give the desired polymer having an $\overline{Mn}$ of 1,800. This polymer will be abbreviated as polymer (B-3-2).

REFERENTIAL EXAMPLE 10

Preparation of a (beta-methyl)glycidyl groupcontaining vinyl polymer (B-2):

By the same operation as in Referential Example 3, 40 parts of GMA, 20 parts of methyl methacrylate, 20 parts of ethyl Cellosolve methacrylate and 20 parts of styrene were polymerized to give the desired polymer having an $\overline{Mn}$ of 1,500. This polymer will be abbreviated as (B-2-3) hereinafter.

REFERENTIAL EXAMPLE 11

Preparation of a (beta-methyl)glycidyl group-containing vinyl polymer (B-2):

By the same operation as in Referential Example 3, 25 parts of GMA, 20 parts of cyclohexyl methacrylate, 20 parts of n-butyl methacrylate and 35 parts of styrene were polymerized to give the desired polymer having an $\overline{Mn}$ of 1,600. This polymer will be abbreviated as polymer (B-2-4).

REFERENTIAL EXAMPLE 12

Preparation of a vinyl polymer as a control:

By the same operation as in Referential Example 3, 7 parts of GMA, 3 parts of beta-hydroxyethyl methacrylate, 25 parts of ethyl Cellosolve methacrylate, 25 parts of methyl methacrylate and 40 parts of styrene were polymerized to give a polymer having an $\overline{Mn}$ of 1,600 and low contents of glycidyl groups and hydroxyl groups. This polymer will be abbreviated as (B'-1-1) hereinafter.

REFERENTIAL EXAMPLE 13

Preparation of a vinyl polymer as a control:

By the same operation as in Referential Example 6, 8 parts of GMA, 24 parts of n-butyl methacrylate, 24 parts of ethyl Cellosolve methacrylate, 25 parts of methyl methacrylate and 40 parts of styrene were polymerized to give a polymer having an $\overline{Mn}$ of 1,600 and a low content of glycidyl groups. This polymer will be abbreviated as polymer (B'-2-1).

REFERENTIAL EXAMPLE 14

Preparation of a vinyl polymer as a control:

Referential Example 6 was repeated except that 7 parts of beta-hydroxyethyl methacrylate, 13 parts of n-butyl methacrylate, 20 parts of ethyl Cellosolve methacrylate, 20 parts of methyl methacrylate and 40 parts of styrene were used instead of the monomeric mixture used in Referential Example 6. There was obtained a polymer having an $\overline{Mn}$ of 1,800 and a low content of hydroxyl groups. This polymer will be abbreviated as polymer (B'-3-1).

EXAMPLES 1-5

In each run, the components indicated in Table 1 were dry-blended and then kneaded by an extruder. The mixture was cooled and pulverized to obtain a powder paint.

The powder paint was then coated on a zinc phosphate-treated steel plate and then baked at 180 minutes. The properties of the cured coated film were measured.

The results are shown in Table 1.

COMPARATIVE EXAMPLES 1-3

Powder paints for control were prepared in the same way as in Examples 1 to 5 except that the vinyl polymers used were changed as shown in Table 1, and their proportions were changed in accordance with the amounts of the functional groups of these polymers. Cured coated films were prepared, and their properties were measured as in Examples 1 to 5.

The results are also shown in Table 1.

COMPARATIVE EXAMPLE 4

Comparative Example 1 was repeated except that the amounts of polyester resin and polymer used in Comparative Example 1 were changed as indicated in Example 1. The results are also shown in Table 1.

TABLE 1

| | Example | | | | | Comparative Example | | | |
|---|---|---|---|---|---|---|---|---|---|
| | 1 | 2 | 3 | 4 | 5 | 1 | 2 | 3 | 4 |
| Blending proportions (parts) | | | | | | | | | |
| Resin (A-1) | 72 | 65 | | | 72 | 82 | 76 | 50 | 72 |
| Resin (A-2) | | | 79 | 73 | | | | | |
| Polymer (B-1-1) | 18 | | 12 | | | | | | |
| Polymer (B-1-2) | | 22 | | 15 | | | | | |
| Polymer (B-1-3) | | | | | 18 | | | | |
| Polymer (B-2-3) | | | | | | 12 | | | 18 |
| Polymer (B-2-4) | | | | | | | 18 | | |
| Polymer (B'-1-1) | | | | | | | | 43 | |
| IPDI ADDUCT (*1) | 10 | 13 | 9 | 12 | 10 | 6 | 6 | 7 | 10 |
| Acrylic flow controlling agent (*2) | | | 0.5 | | | | | 0.5 | |
| DBTDL (*3) | | | 0.3 | | | | | 0.3 | |
| Titanium dioxide | | | 43 | | | | | 43 | |
| Film properties | | | | | | | | | |
| Appearance | | | ◯ | | | Δ | Δ-X | Δ | Δ |
| Erichsen (mm) | | | >7 | | | >7 | 5.0 | <1 | 6.5 |
| Impact strength (1 kg × xcm) | | | >50 | | | 40 | 10 | <10 | 30 |
| Bending property (OT) | | | ◎ | | | X | X | X | X |
| Staining Red felt pen | | | ◎ | | | Δ | Δ-X | X | Δ |
| resistance Blue felt pen | | | ◎ | | | Δ | Δ-X | X | Δ |
| Black felt pen | | | ◯ | | | Δ | Δ-X | X | Δ |
| Weatherability (*4) | 93 | 90 | 92 | 93 | 95 | 85 | 60 | 30 | 75 |

Note to Table 1
(*1): IPDI ADDUCT is an epsilon-caprolactam block adduct of isophorone diisocyanate (masked NCO = 15%; a product of Huls Company, West Germany).
(*2): The acrylic flow controlling agent is a polymer of 2-ethylhexyl acrylate (a product of BASF, West Germany).
(*3): DBTDL is dibutyltin dilaurate used as a curing catalyst.
(*4): Gloss retention (%) determined after exposure to a Sunshine Weater-O-meter for 500 hours.

The appearance, bending property and staining resistance were evaluated on the following scale.

◎ : excellent
◯ : good
Δ: fairly good
X: poor

EXAMPLES 6-9 AND COMPARATIVE EXAMPLES 5-8

In each run, the components indicated in Table 2 were dry-blended and then kneaded by an extruder. The mixture was cooled and pulverized to obtain a powder The powder paint was then coated on a zinc phosphate-treated steel plate and then baked at 180° C. for minutes. The properties of the cured coated film were measured.

The results are shown in Table 2.

TABLE 2

| | Example | | | | Comparative Example | | | |
|---|---|---|---|---|---|---|---|---|
| | 6 | 7 | 8 | 9 | 5 | 6 | 7 | 8 |
| Blending proportions (parts) | | | | | | | | |
| Resin (A-1) | 72 | 65 | | | 82 | 76 | 50 | 72 |
| Resin (A-2) | | | 79 | 73 | | | | |
| Polymer (B-2-1) | 10 | | 6 | | 12 | | | |
| Polymer (B-2-2) | | 11 | | 8 | | 18 | | |
| Polymer (B-3-1) | 8 | | 6 | | | | | |
| Polymer (B-3-2) | | 11 | | 7 | | | | |
| Polymer (B'-2-1) | | | | | | | 35 | 10 |
| Polymer (B'-3-1) | | | | | | | 18 | 8 |
| IPDI ADDUCT (*1) | 10 | 13 | 9 | 12 | 6 | 6 | 7 | 10 |
| Acrylic flow controlling agent (*2) | | | 0.5 | | | | 0.5 | |
| DBTDL (*3) | | | 0.3 | | | | 0.3 | |
| Titanium dioxide | | | 43 | | | | 43 | |
| Film properties | | | | | | | | |
| Appearance | | | ◯ | | Δ | Δ | Δ-X | X |
| Erichsen (mm) | | | >7 | | >7 | 5.3 | <1 | 5.8 |
| Impact strength | | | >50 | | 40 | 20 | 20 | 30 |
| (1 kg × xcm) | | | | | | | | |
| Bending property (OT) | | | ◎ | | X | X | X | X |
| Staining Red felt pen | | | ◎ | | Δ | Δ | X | X |
| resistance Black felt pen | | | ◎ | | Δ | Δ | X | X |
| Weatherability (*4) | 90 | 95 | 93 | 92 | 70 | 60 | 35 | 65 |

(*1), (*2), (*3) and (*4) are the same as the note to Table 1.

The results given in Tables 1 and 2 demonstrate that the resin compositions of this invention give coated films having excellent appearances, mechanical strengths and weatherabilities than do the resin compositions of Comparative Examples.

What is claimed is:

1. A resin composition for use in a powder paint, said composition comprising as essential components either
   (A) 60 to 96 parts by weight of a polyester resin having an acid number of 5 to 100 mg KOH/g, a hydroxyl number of 5 to 100 mg KOH/g, a softening point of 80° to 150° C. and a number average molecular weight of 1,000 to 10,000,
   (B-1) 3 to 40 parts by weight of a vinyl polymer containing both (beta-methyl)glycidyl and hydroxyl groups and having a number average molecular weight of 300 to 8,000, said polymer being obtained from 10 to 95% by weight of at least one (beta-methyl)glycidyl group-containing vinyl monomer selected from the group consisting of glycidyl acrylate, glycidyl methacrylate, beta-methylglycidyl acrylate and beta-methylglycidyl methacrylate, 5 to 60% by weight of a hydroxyl group-containing vinyl monomer and 0 to 85% by weight of another vinyl monomer, and
   (C) 1 to 20 parts by weight of a blocked isocyanate; or
   (A) 60 to 96 parts by weight of a polyester resin having an acid number of 5 to 100 mg KOH/g, a hydroxyl number of 5 to 100 mg KOH/g, a softening point of 80 to 150° C. and a number average molecular weight of 1,000 to 10,000,
   (B-2) 3 to 40 parts by weight of a (beta-methyl)glycidyl group-containing vinyl polymer having a number average molecular weight of 300 to 8,000 and obtained from 10 to 95% by weight of at least one (beta-methyl)glycidyl group-containing vinyl monomer selected from the group consisting of glycidyl acrylate, glycidyl methacrylate, beta-methylglycidyl acrylate and beta-methylglycidyl methacrylate and 5 to 90% by weight of another vinyl monomer copolymerizable with the (beta-methyl)glycidyl group-containing vinyl monomer,
   (B-3) 3 to 40 parts by weight of a hydroxyl group-containing vinyl polymer having a number average molecular weight of 300 to 8,000 and obtained from 10 to 95% by weight of a hydroxyl group-containing vinyl monomer and 5 to 90% by weight of another vinyl monomer copolymerizable with the hydroxyl group-containing vinyl monomer, and
   (C) 1 to 20 parts by weight of a blocked isocyanate.

2. The composition of claim 1 which comprises 60 to 90 parts by weight of the component (A), 7 to 30 parts by weight of the comonent (B-1) and 3 to 15 parts by weight of the component (C).

3. The composition of claim 1 which comprises 60 to 90 parts by weight of the component (A), 7 to 30 parts by weight of the component (B-2), 7 to 30 parts by weight of the component (B-3) and 3 to 15 parts by weight of the component (C).

4. The resin composition of claim 1 wherein the polyester resin (A) has an acid number of from 10 to 70, a hydroxyl number of 10 to 70, a softening point of 100° to 130° C., and a number average molecular weight of 2,000 to 5,000.

5. The resin composition of claim 2 wherein the vinyl polymer (B-1) is obtained from 15 to 85% by weight of said at least one glycidyl group-containing vinyl monomer and from 7 to 50% by weight of said hydroxyl group-containing vinyl monomer and 20 to 75% by weight of another vinyl monomer.

* * * * *